Oct. 20, 1953 — G. L. MATHESON — 2,656,242
APPARATUS AND PROCESS FOR HANDLING FLUIDIZED SOLIDS
Filed June 27, 1952
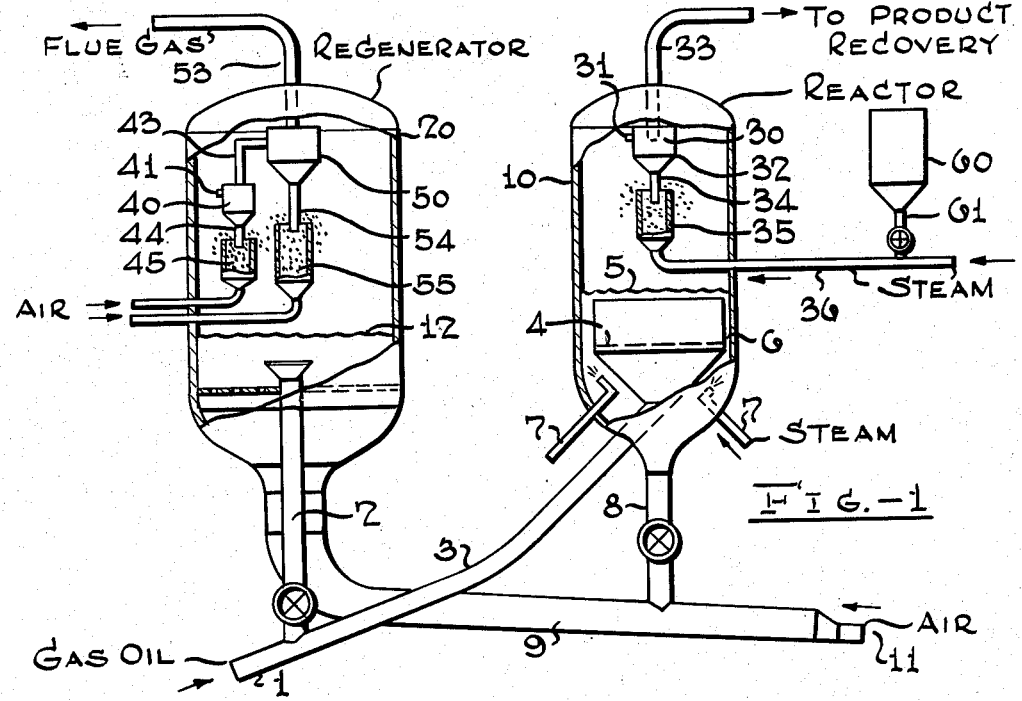
FIG.-1
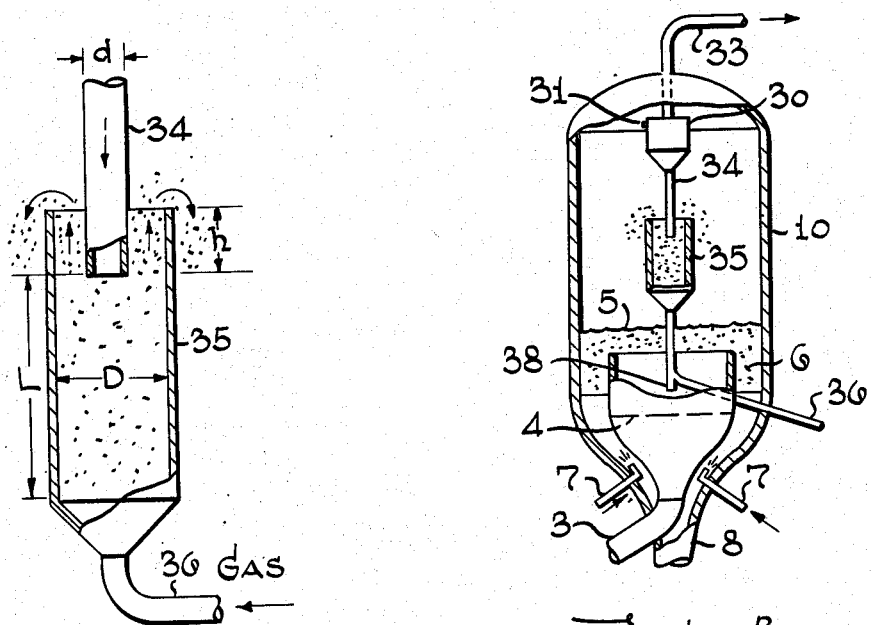
FIG.-2
FIG.-3
George L. Matheson Inventor
By Peter H. Smolka Attorney Patented Oct. 20, 1953

2,656,242

UNITED STATES PATENT OFFICE 2,656,242

APPARATUS AND PROCESS FOR HANDLING FLUIDIZED SOLIDS

George L. Matheson, Summit, N. J.; The Summit Trust Company, Summit, N. J., the alternate executor of said George L. Matheson, deceased, assignor to The Standard Oil Development Company, a corporation of Delaware Application June 27, 1952, Serial No. 296,043

8 Claims. (Cl. 23—1)

This invention relates to an improvement in the contacting of gases with finely divided fluidized solids. It relates particularly to an improved cyclone separator and its use in reducing catalyst loss from units containing the catalyst in fluidized form.

In processes employing the fluid solids technique powdered catalyst is maintained by upflowing gases as a relatively dense, turbulent bed in the lower part of the contacting vessel, with a more dilute phase thereabove. Cyclones are commonly located in the dilute phase near the top of such contacting vessels, for the purpose of separating entrained fines from the gas before the latter is discharged from the vessel. The separated fines are then returned to the dense turbulent catalyst bed by a dip leg which extends downwardly from the cyclone to a point beneath the normal level of the dense, turbulent catalyst bed.

However, in present operations difficulties are encountered when the surface of the dense catalyst bed drops below the bottom end of the cyclone dip leg, so that the latter ends in the dilute rather than in the dense catalyst phase. Whenever this happens the gases and entrained solids in the upper portion of the contacting vessel enter the cyclone not only through the cyclone inlet, but also pass upwardly through the exposed cyclone dip leg. As a result the cyclone virtually ceases to perform its intended function and relatively large amounts of fine solids remain in the gas stream leaving the cyclone. This condition is not only likely to occur when the depth of the dense bed level in the contacting zone is suddenly lowered while the unit is in operation, but also occurs between the start-up of a fluid unit and the time when the dense bed finally builds up to a level above the outlet of the cyclone dip leg.

Various expedients have been previously proposed for sealing the dip leg whenever the dense bed level drops too low to serve as an effective seal. Thus, it has been suggested to provide the dip leg with a damper or butterfly valve having a stem extending from the dip leg all the way to the outside of the reactor vessel, so as to permit closing the dip leg when necessary. But this has not proved entirely successful since, at the high temperatures encountered in catalytic cracking and other hydrocarbon conversion processes, the valves in the dip legs tend to become very stiff, with the result that the long valve stem eventually breaks off. If this leaves the valve in closed position, the entire unit may then have to be shut down for repairs.

Another proposal appears in U. S. Patent 2,472,427 and involves immersing the dip leg in a deep aerated seal pot installed around the dip leg so that the latter extends almost to the bottom of the pot. Thus catalyst contained in the pot acts as a fluid seal for the dip leg. Such seal pots, when entirely immersed in the dense catalyst bed, operate reasonably well while the operation is in normal progress. They cushion the dip leg against sudden pressure surges in the reactor. However, if the dense bed stays below the brim of the seal pot for longer periods, the seal pot soon loses its effectiveness due to excessive channelling or so-called "rat-holding" of gas through the catalyst in the pot, or if aeration is shut off, the entire device gets plugged with packed catalyst. It appears that when the pot is submerged in the dense catalyst bed, enough of the relatively coarse particles trickle down into the pot to make the contents of the pot easy to fluidize. But when the brim of the pot is above the dense bed level for any appreciable length of time, the contents of the seal soon consist exclusively of fines separated in the cyclone, with the result that fluidization of the contents in the narrow annulus between the dip leg and the surrounding pot becomes extremely difficult and irregular. Such seal pots have therefore been found undependable as seals for cyclone dip legs either when the unit is first started, or when the unit is operated for extended periods under such conditions that the brim of the seal pot extends a substantial distance above the dense bed level.

It is the object of the present invention to devise a seal pot adapted to seal cyclone dip legs even when it is not submerged in the dense catalyst bed. Another object is to improve the operation of seal pots for cyclone dip legs that terminate in a dilute gas phase. These and other objects, as well as their achievement, will become apparent from the subsequent detailed description and attached drawing in which Figure 1 is a schematic flow diagram of a commercial catalytic cracking unit having cyclones in the upper parts of the reactor and regenerator vessels, and having the dip legs of the cyclones protected by the seal pots in accordance with the present invention;

Figure 2 is a more detailed vertical section of cyclone dip leg and associated improved seal pot; and Figure 3 is a vertical section through a reaction vessel which embodies the novel cyclone and seal pot and includes means for lifting coarse catalyst from the main fluidized bed to the seal pot.

Referring as an example to the catalytic cracking unit illustrated in Figure 1, a gas oil feed stock introduced through line 1 is mixed with hot powdered catalyst such as conventional silica-alumina or clay cracking catalyst descending from regenerator standpipe 2. The resulting dilute suspension of catalyst in hydrocarbon vapors is passed through line 3 and grid 4 into reactor vessel 10. In the lower part of reactor 10 the catalyst present in the vapors settles out to form a dense fluidized bed having a surface or an upper level 5, while a dilute gas phase containing a relatively small load of entrained catalyst particles is formed above the dense bed level. Spent catalyst continuously overflows from the dense bed into stripping well 6 into which steam or other inert stripping gas is injected through line 7.

Stripped spent catalyst then descends through reactor standpipe 8 into line 9 where it is mixed with air introduced at 11. The resulting dilute mixture of spent catalyst suspended in air passes upwardly into regenerator 20 where carbonaceous deposits are burnt off the catalyst in the dense fluid bed having an upper level 12, above which is a relatively dilute phase containing some catalyst particles entrained in the flue gases leaving the dense bed. Regenerated catalyst overflows into standpipe 2 for use with fresh feed stock, all in a manner heretofore well known.

The present invention relates particularly to the cyclonic devices used to separate entrained solids from the gaseous products leaving reactor 10 and regenerator 20. Specifically referring to cyclone 30 in reactor 10, it comprises an inlet 31 through which enter the gaseous reaction products and entrained solids, a cylindrical or inverted conical barrel or body portion 32, an outlet pipe 33 for discharging substantially dust free cracked hydrocarbon vapors from a central portion of the barrel, and a relatively short dip leg 34 which serves to return separated solid particles to the fluidized bed and terminates in the upper portion of reactor 10, substantially above the dense bed level 5. Dip leg 34 extends a short distance below the brim of an especially designed seal pot 35 which embodies the essence of the invention and is shown in greater detail in Figure 2. The minimum length of the dip leg is thus governed solely by the pressure drop of the cyclone; that is, the dip leg must be long enough so that the column of solids contained therein exerts a sufficiently high hydrostatic pressure to prevent reaction gases from rising up through the dip leg instead of entering through the proper cyclone inlet.

It has been found that when the brim or open end of an ordinary seal pot is located in fluidized reactors above the surface of the dense bed such as level 5 in reactor 10, the seal pot does not produce an effective seal. This appears to be due to the fact that the solids in such a seal pot consist essentially of the fines separated in the cyclone, that is, of particles the diameter of which is generally in the range between 0 to about 40 or 60 microns when the superficial upward gas velocity in the main vessel is relatively low, e. g. less than 2.5 ft./sec., and particularly when it is less than 0.5 ft./sec. Mixtures consisting of such fines are well known to be difficult to fluidize and thus normal seal pots containing such fines tend to cause excessive channelling and frequent blowing out of the fluid seal by slight pressure surges. When this happens, the gas and entrained solids enter the cyclone not only through the cyclone inlet, but also rise through the open dip leg. Until a sufficient layer of solids gradually builds up again in the seal pot to reestablish a seal around the dip leg, catalyst blows through the cyclone with the outgoing gases and is lost. This reestablishment of the required seal may take quite some time, since the rush of air up the dip leg is so great that a layer of solids will not build up in the cyclone while the gas flow is on. Alternately, when the fluid seal under the dip leg is destroyed, the catalyst fines in the dip leg may pack together and plug the dip leg, again preventing the cyclone from functioning.

According to the present invention it has been discovered that even solids consisting essentially of fines only can be satisfactorily fluidized and formed into an effective seal, provided that the seal pot is designed so as to exhibit certain characteristics. Specifically referring to Figure 2 of the drawing, the novel seal pot must be adapted to contain a fluidized bed of solids having a depth $L$ below the end of the dip leg which is at least 2.5 times the diameter $D$ of the seal pot, preferably 3.5 to 6 times the diameter. Typically the dip leg 34 of a commercial cyclone may have a diameter $d$ of about 4 to 10 inches and may be immersed below the upper brim of seal pot 35 to a depth $h$ of about 3 to 12 inches; and the associated seal pot should have a diameter $D$ equal to about 1.4 to 4 $d$, or about a 5 to 15 inch pot diameter for relatively small dip legs and up to about 40 inch diameter for large dip legs. The depth $L$ of the seal pot below the end of the dip leg may correspondingly range between about 12.5 and 120 inches, as determined by the above specified $L/D$ ratio.

With a cyclone and seal pot designed as just described, it has been found possible to form an aerated bed of fine solids which act as an effective seal under the dip leg, even when the solids consist of fines only. Thus solids separated from the gas stream in cyclone separator 32 pass through dip leg 34 into the aerated mass of solids in seal pot 35 and eventually overflow from the seal pot into the main fluidized bed in the lower part of the reactor vessel 10. At the same time the aerated mass in seal pot 35 prevents reaction vapors from rising through dip leg 34.

The required aeration gas is injected into the seal pot 35 through line 36, the amount of gas injected being preferably such as to create a linear upward superficial gas velocity of about 0.05 to 0.5, or preferably 0.1 to 0.2 ft./sec. within the seal pot. Appreciably higher velocities are undesirable since they cause too much catalyst to entrain up the dip leg and out through the cyclone. Various gases may be used for aeration of the seal pot, depending on the atmosphere in which the seal pot is located. For instance, if the seal pot and associated cyclone are located in a hydrocarbon conversion vessel, the seal pot can be aerated with the aid of steam, light hydrocarbons, flue gas, nitrogen or other suitable inert gas. Or when the seal pot is located in a catalyst regeneration vessel, it may be aerated with air, flue gas, steam, etc.

The present invention is particularly advantageous when used with a secondary cyclone. To obtain relatively complete separation of entrained solids from a gas stream, it is often desirable to pass such a stream through two or more cyclones in series, as shown for purposes of illustration in Figure 1 within the regenerator vessel 20. In such a set-up the gas stream and entrained solids enter primary cyclone 40 through inlet 41. Relatively coarse solids separate fairly readily in the primary cyclone and pass back into the main fluidized bed via dip leg 44 and seal pot 45. However, the gas stream leaving the primary cyclone through line 43 still contains an appreciable amount of suspended fines. Line 43 is therefore discharged into a secondary cyclone 50 where fines are separated from the gas stream. A substantially dust-free gas stream may then be drawn off through line 53, or when not sufficiently dust free, the effluent gas from the secondary cyclone 50 may be passed in series to further auxiliary cyclones such as a tertiary cyclone and so on.

When desired, seal pot 45 under primary cyclone 40 or any similar seal pots under any intermediate cyclones may even be completely omitted, as long as the dip leg of the last cyclone of a series, e. g. dip leg 54 of cyclone 50, is provided with a seal pot. In such an arrangement, if the dense bed level 12 drops below the open bottom of the primary cyclone dip leg 44 or a similar intermediate dip leg, gases and entrained solids start rising through such a dip leg and leave the cyclone through outlet line 43 without appreciable separation. But as long as at least the last cyclone 50 of the series is provided with a protective seal pot, the gas and entrained solids passing from temporarily ineffective cyclone 40 through line 43 are eventually separated in cyclone 50 and the solids overflow back into the main turbulent bed via dip leg 54 and seal pot 55. Of course, as soon as bed level 12 rises high enough to cover or submerge the primary dip leg 44, the entire series of cyclones becomes once again fully operative.

The size of the solids separated in the secondary and any successive cyclones in progressively finer, often being smaller than 40 or even 20 microns, so that such solids are increasingly difficult to fluidize in seal pots such as pot 55 which serves as a seal for dip leg 54. It is particularly with such secondary cyclones that the present seal pot design characterized by an L/D ratio preferably in excess of 3 offers unobvious advantages with respect to ease of fluidization.

It has also been discovered that fluidization in cyclone seal pots can be further improved by injecting into the pot relatively coarse solids such as fresh or used catalyst which may normally contain particles ranging in diameter between about 0 and 100 or 200 microns, with at least about 30 or 40 percent by weight being above 80 microns. This expedient may be used with considerable success as an alternative to the critical pot design described earlier herein, but is particularly advantageous when used in conjunction therewith. Referring specifically to Figure 1, relatively coarse catalyst from a storage hopper 60 may be added through conduit 61 to the aeration gas in line 36 which leads to seal pot 35. It is desirable to add the coarse solids to the aeration gas in a ratio of about 0.1 to 0.25 lb./cu. ft. and to maintain the velocity in aeration pipe such as line 36 at a value not less than 15 feet/sec., preferably about 50 to 100 or even 200 ft./sec. in order to carry the solids in a smooth, even manner. Of course, the linear velocity of the gas stream drops to about 0.05 to 0.5 ft./sec. as soon as the stream enters the relatively wide seal pot 35. For good fluidity, it is desirable that the coarse particles be added to the seal pot in a sufficient amount to form a mixture having at least 10 weight percent of particles over 80 microns.

Instead of adding relatively coarse catalyst from an extraneous source as just described, during the course of a run it may be advantageous to add coarse catalyst to the fines in seal pot 35 by lifting a portion of the catalyst from beneath the dense bed level 5. This is particularly illustrated in Figure 3 wherein seal pot 35, otherwise similar to that shown in Figure 1, includes an aspirator or gas lift for raising relatively coarse catalyst from the main fluidized bed to the seal pot.

Referring specifically to Figure 3, it can be seen that seal pot aeration line 36 rises upwardly through the lower part of vessel 10. Before entering seal pot 35 the aeration line 36 is joined by a spur or aspirator line 38 which has its lower, open end submerged below dense bed level 5. As a result, when an appropriate aeration gas is blown through line 36 into seal pot 35, preferably at a superficial velocity of about 60 to 200 ft./sec., a portion of the relatively coarse catalyst from the main catalyst bed is raised by the resulting aspiration effect through line 38 and serves to improve the fluidization characteristics of the fines which are discharged into seal pot 35 from cyclone 30.

The addition of extraneous solids such as fresh catalyst from hopper 60 to the aeration gas may also be particularly advantageous at the beginning of a run. This allows forming a seal at the bottom of the dip leg even before enough solids are separated from the regular reactor effluent to seal the dig leg. Alternatively, to assure proper functioning of the seal pot during the very beginning of a run, solids may be separately added to the seal pot or directly to the cyclone before the main reactor is actually set in operation.

Having described the invention and an illustrative operation thereof, it will be understood that variations and modifications thereof may be employed without departing from the scope of the invention for which patent protection is sought as defined in the appended claims.

In the claims:

1. In an apparatus for contacting gas and finely divided solids which comprises a closed contacting chamber adapted to contain a dense turbulent bed of fluidized finely divided solids in the lower part thereof, means adapted to introduce gas into the bottom part of the chamber, a cyclonic dust separator mounted in an upper part of the chamber, said dust separator comprising a barrel of circular cross-section, an inlet adapted to introduce a stream of gas and suspended solids tangentially into said barrel, a gas outlet adapted to remove relatively dust-free gas from a central portion of the barrel, and a substantially vertical dip leg depending from said barrel and having a terminal opening in an upper part of said contacting chamber, the improvement which comprises, in combination with said dip leg, an open-top seal pot having a diameter D and surrounding the bottom end of said dip leg and forming an annulus therewith, said seal pot having a diameter of about 1.4 to 4 times as great as the diameter of the dip leg and extending downwardly a distance L beneath the terminal opening of the dip leg, the ratio $L/D$ being at least 2.5, and a means adapted to introduce gas to a bottom cross-section of the seal pot.

2. An apparatus according to claim 1 wherein the ratio $L/D$ is between 3.5 and 6.

3. An apparatus according to claim 1 wherein the dip leg is immersed into the seal pot to a distance of about 3 to 12 inches.

4. An apparatus according to claim 1 wherein the means adapted to introduce gas to the seal pot comprises a gas conduit and a solids storage vessel fluidly communicating with said conduit and adapted to discharge solids into said conduit.

5. In combination with an apparatus comprising a closed contacting chamber containing a plurality of cyclones mounted in series in the upper part thereof, each of said cyclones having a dip leg open at its lower end, the improvement which comprises a seal pot having a diameter D and surrounding the bottom end of the dip leg of the last cyclone of said series, said seal pot having a diameter of about 1.4 to 4 times as great as the diameter of the said dip leg and extending downwardly a distance L beneath the end of the said dip leg, the ratio $L/D$ being between about 3.5 and 6, and a conduit adapted to admit gas to the bottom of the seal pot for upward passage through the seal pot.

6. In a process wherein finely divided solids and gases are contacted in a contacting zone as a dense, turbulent, fluidized bed having a surface in a lower part of said contacting zone, with a more dilute phase above said surface, and wherein fresh principal gas is introduced into a bottom portion of the said dense bed and treated gas is withdrawn from the said dilute phase in the upper part of the contacting zone after passage through a dust separating zone where entrained solids are separated and removed downwardly as a dense substantially vertical column and wherein the said column of separated solid fines terminates a substantial distance above the said surface of the dense bed, the improvement which comprises discharging the said column of solid fines into a substantially vertical elongated sealing zone having an open top and surrounding the bottom end of said column whereby a dense bed of solids is formed around the bottom discharge end of the column, said sealing zone being characterized by a ratio of zone diameter to zone depth beneath the discharge end of the said column of not more than ⅓ and being further characterized by having a zone diameter of about 1.4 to 4 times as great as the diameter of the said column, injecting an aeration gas into the bottom of the said sealing zone, passing the injected gas upwardly through the dense bed of solid fines at an upward superficial gas velocity of about 0.05 to 0.5 ft./sec., said injected aeration gas being inert with respect to the principal gas contained in the contacting zone, and overflowing solid fines from the sealing zone to the said dense, turbulent bed of solids present in the lower part of the contacting zone.

7. In a process wherein finely divided solids and gases are contacted in a contacting zone as a dense, turbulent fluidized bed having a surface in a lower part of said contacting zone, with a more dilute phase above said surface, and wherein fresh principal gas is introduced into a bottom portion of the said dense bed and treated gas is withdrawn from the said dilute phase in the upper part of the contacting zone after passage through a centrifugal dust separating zone where entrained solid fines consisting essentially of particles less than about 40 microns in diameter are separated and removed downwardly as a dense substantially vertical column from the bottom of the separation zone and wherein said column of separated fines terminates a substantial distance above the surface of the dense bed, the improvement which comprises discharging the said column of fines into a mass of fines below the surface of the said mass, said mass of fines being maintained in a sealing zone and having its surface a substantial distance above the surface of the dense, turbulent bed of finely divided solids maintained in the lower part of the contacting zone, separately forming a suspension of an inert aeration gas and relatively coarse solids having a particle diameter of about 80 to 200 microns, passing the resulting suspension at a superficial gas velocity of about 15 to 50 ft./sec. to the bottom of the sealing zone, mixing the relatively coarse solids with the mass of fines in the sealing zone in a sufficient amount to form a mixture containing at least 10 weight percent of said relatively coarse solids, passing the aeration gas upwardly through the mixed solids in the sealing zone at a superficial gas velocity of 0.05 to 0.5 ft./sec., and overflowing the mixed solids from the sealing zone into the dense bed of finely divided solids in the lower part of the contacting zone.

8. A process according to claim 7 wherein the relatively coarse solids are mixed with the inert aeration gas in a ratio between about 0.1 and 0.25 lbs. of solids per cubic foot of gas before introduction into the sealing zone.

GEORGE L. MATHESON.

References Cited in the file of this patent
UNITED STATES PATENTS

| Number | Name | Date |
|---|---|---|
| 2,472,427 | Johnson | June 7, 1949 |